E. THOMAS & P. V. HOUSMAN.
LIVE STOCK WATERING APPARATUS.
APPLICATION FILED MAR. 24, 1915.
1,150,978.
Patented Aug. 24, 1915.
2 SHEETS—SHEET 2.
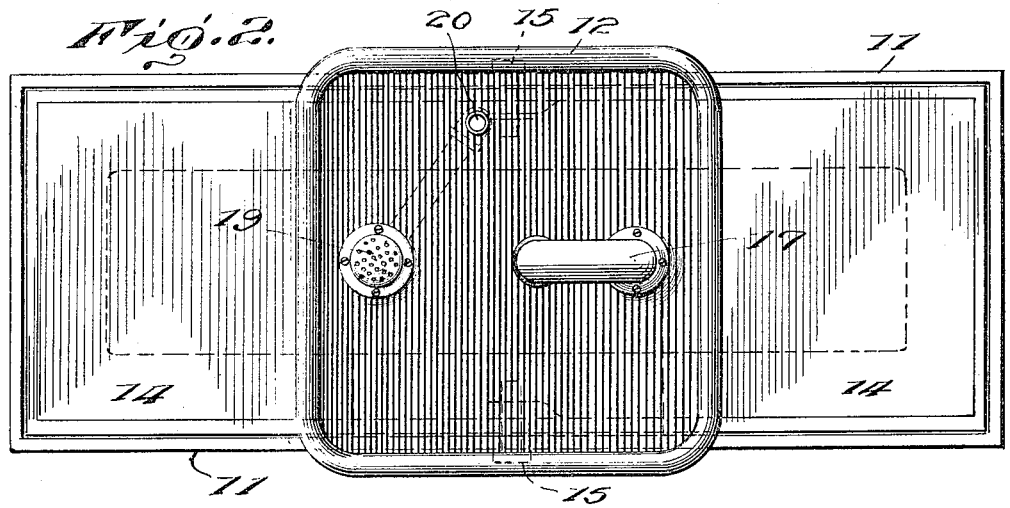
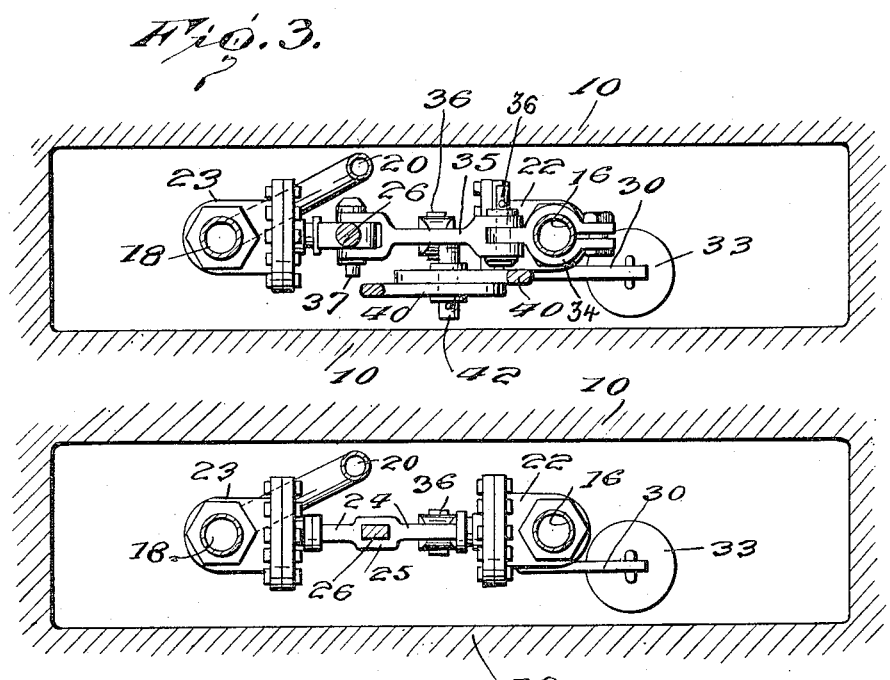
Inventors
E. Thomas
P. V. Housman

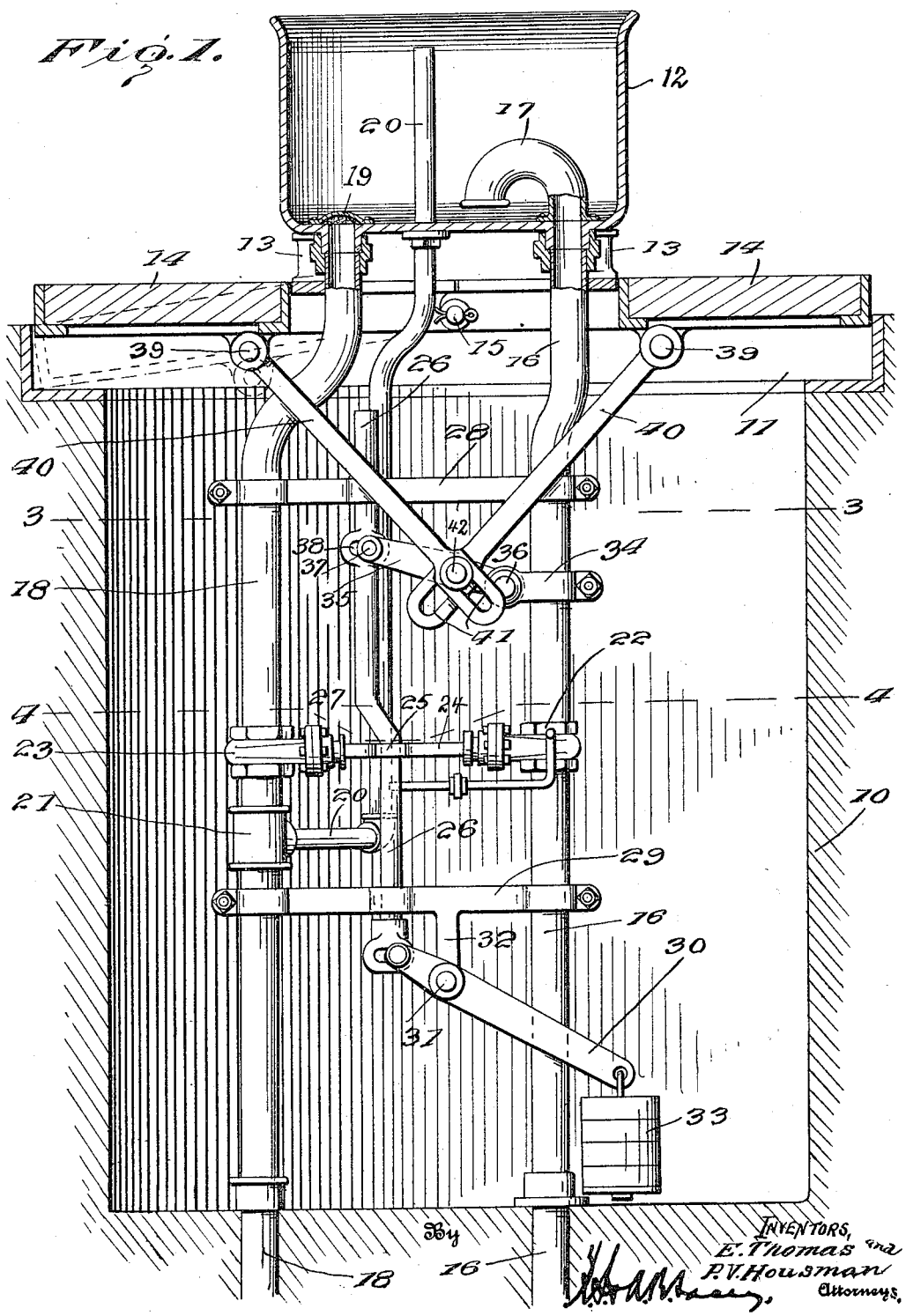

UNITED STATES PATENT OFFICE.

EDWARD THOMAS AND PETER V. HOUSMAN, OF ALTON, ILLINOIS.

LIVE-STOCK-WATERING APPARATUS.

1,150,978.    Specification of Letters Patent.    Patented Aug. 24, 1915.

Application filed March 24, 1915. Serial No. 16,754.

*To all whom it may concern:*

Be it known that we, EDWARD THOMAS and PETER V. HOUSMAN, citizens of the United States, residing at Alton, in the county of Madison and State of Illinois, have invented certain new and useful Improvements in Live-Stock-Watering Apparatus, of which the following is a specification.

This invention relates to apparatus for watering stock of the class wherein the weight of the animal is utilized to cause the water to flow into the watering trough, when required, and to shut off the water when the animal retires, and has for one of its objects to simplify and improve the construction and increase the efficiency and utility of a device of this character.

Another object of the invention is to provide a device of this character having an inlet and an outlet operative by the weight of the animal when approaching the trough and whereby the outflow is shut off and the inlet opened by the weight of the animal, and the inflow automatically cut off and the outflow automatically opened when the animal retires.

With these and other objects in view, the invention consists in certain novel features of construction as hereinafter shown and described and then specifically pointed out in the claims; and in the drawings illustrative of the preferred embodiment of the invention, Figure 1 is a side elevation of the improved device partly in section; Fig. 2 is a plan view of the same; Fig. 3 is a section on the line 3—3 of Fig. 1; Fig. 4 is a section on the line 4—4 of Fig. 1.

Corresponding and like parts are referred to in the following description and indicated in all the views of the drawings by the same reference characters.

The improved device comprises a watering trough, a supply pipe for the trough, a waste pipe leading from the bottom of the trough, a movable platform upon which the animal steps when approaching the trough, controlling valves in the supply pipe and in the waste pipe, and mechanism operating to alternately open and close the valves and operative by the movable platform, so that an animal approaching the trough and mounting the platform causes the valve of the supply pipe to be opened and the valve of the waste pipe to be closed, and automatic means operating to reverse the position of the valves and restore the platforms to their normal position when the animal retires therefrom and thus close the supply valve and open the waste valve.

In the drawings illustrative of the preferred embodiment of the invention, the device is arranged over a cavity in the ground and surrounded by a suitable retaining wall, preferably concrete, and indicated at 10. A suitable curbing, indicated conventionally at 11, is supported upon the upper portion of the walls 10. Mounted upon the center of the curbing, is a watering trough, indicated conventionally at 12 and supported from the curbing by suitable standards 13. Platforms 14 extend at either side of the trough above the curbing 11 and pivotally united at 15 to the curbing. The intake pipe for the water supply is represented at 16 and leading through the bottom of the trough and preferably provided with a "gooseneck" 17 at the upper end.

Leading from the trough 12, is a waste pipe 18 with a perforated screen 19 above the upper terminal of the waste pipe. An overflow pipe 20 is connected into the trough 12 and leads into the waste pipe at 21. A suitable controlling valve, represented conventionally at 22, is connected into the intake 16, while a similar controlling valve 23 is connected into the waste pipe 18. The stems 24 of the valves are united intermediate their ends to a yoke 25 through which a bar 26 operates, the bar having an offset 27 intermediate its ends. The bar 26 is supported for vertical movement through suitable carrier devices 28—29. At its lower end, the bar 26 is connected to a lever 30 which is pivotally supported at 31 from a hanger 32 depending from the supporting member 29. The lever 30 is provided with a weight 33, the lever and the weight, operating to retain the bar 26 yieldably in its upper position, as shown in full lines in Fig. 1.

Connected to one of the pipes 16 or 18, preferably to the pipe 16, is a bracket device 34 to which a lever arm 35 is pivotally united at 36. At its free end, the lever arm 35 is pivoted at 37 in a transverse slot 38 in the member 26. By this arrangement, it will be obvious that when the lever 35 is moved upon its pivot 36, the bar 26 will be correspondingly moved vertically through the members 28—29 and cause the offset portion 27 to actuate the stems 24 of the valves 23. Thus, when the bar 26 is held in its upward position by the weight 33 and lever 30, the lower portion of the bar 26 will retain the stems 24 in one position and close the valve 22 and open the valve 23, and then when the bar 26 is moved downwardly, the offset 27 will move the valve stems in the opposite direction and close the valve 23 and open the valve 22.

Pivoted, respectively, to the platforms 14, at 39, are link devices 40, each link device having a slot 41 at its lower end slidably engaging a pivot 42 carried by the lever arm 35. With an apparatus thus constructed, the weight 33 exerts its force to maintain the bar 26 in its upper position with the lever 35 likewise in its upper position and thus holds the platforms 14 in their upper position through the engagement therewith of the links 40. When an animal desires to drink, and steps upon either one of the platforms 14, the latter is depressed and correspondingly depresses the lever 35 through the connection therewith of the link 40 and moves the bar 26 downwardly against the resistance of the weight 33 and causes the offset 27 to open the valve 22 and close the valve 23, thus permitting water to flow through the pipe 16 into the watering trough and shutting off the outflow through the pipe 18. The water is thus held in the watering trough until the animal has satisfied its thirst, and when the animal retires from the platform, the reaction of the weight 33 automatically reverses the position of the bar 26 and causes the offset 27 to reverse the movement of the valve stems and closes the valve 22 and shuts off the further flow of water and open the valve 23 and permits the water to escape from the watering trough. When an animal mounts either one of the platforms, the link 40, with which that particular platform is connected, operates the lever 35, while the other platform and its link 40 remain idle by reason of the presence of the slots 41 in the links. When one of the platforms 14 is depressed by the weight of an animal, the other platform will also move downwardly to the same extent, and if a second animal approaches the trough while the first animal is still drinking, he simply steps upon the depressed platform without actuating the same.

The improved device is simple in construction, can be inexpensively manufactured and installed in any required locality where a supply of water is obtainable.

Having thus described the invention, what is claimed as new is:

1. In a device of the class described, a receiver, a supply conductor for said receiver, a discharge conductor for said receiver and spaced from the supply conductor, brace devices connecting said conductors and spaced apart and each having a guideway, a controlling valve in the supply conductor, a controlling valve in the discharge conductor, the stems of said valves being connected, a member movable through said guideways and engaging said connected valve stems and operating to alternately open one valve and close the other valve when moved through the guideways, and means adapted to be actuated by an animal when approaching said receiver for operating said movable member.

2. In a device of the class described, a receiver, a supply conductor for said receiver, a discharge conductor for said receiver and spaced from the supply conductor, brace devices connecting said conductors and spaced apart and each having a guideway, a controlling valve in the supply conductor, a controlling valve in the discharge conductor, said valves being connected and located between the guide devices and the stems of the valves, a member movable through said guideways and engaging said connected valve stems and operating to alternately open one valve and close the other valve when moved through the guideways, and means for operating said movable member.

3. In a device of the class described, a supply conductor and a discharge conductor spaced apart and each having a controlling valve with the stems of the valves connected, brace devices connected to said conductors and each having a guideway, a valve operating member movable through said guideways and engaging said connected valve stem and operating to alternately open one valve and close the other valves when moved through the guideways, and means for operating said movable member.

4. In a device of the class described, a supply conductor and a discharge conductor spaced apart and each having a controlling valve with the stems of the valves connected, brace devices connected to said conductors and spaced from the valves at opposite sides thereof and each having a guideway, a valve operating member movable through said guideways and engaging said connected valve stems and operating to alternately open one valve and close the other valve when moved through the guideways, and means for operating said movable member.

5. In a device of the class described, a receiver, a supply conductor for said receiver, a discharge conductor for said receiver and spaced from the supply conductor, brace devices connecting said conductors and spaced apart and each having a guideway, a controlling valve in the supply conductor, a controlling valve in the discharge conductor, the stems of said valves being connected, a member movable through said guideways and engaging said connected valve stems and operating to alternately open one valve and close the other valve when moved, a platform movable under the weight of an animal approaching the receiver, connecting means between said platform and said valve actuating member whereby when the platform is depressed by the weight of an animal the controlling valve of the supply conductor will be opened and the controlling valve of the discharge conductor will be closed, and means for automatically returning the valve operating member to its normal postion when the animal retires from the platform.

In testimony whereof we affix our signatures in presence of two witnesses.

EDWARD THOMAS.
PETER V. HOUSMAN.

Witnesses:
KATIE ULLRICH,
E. N. ULLRICH.

Copies of this patent may be obtained for five cents each, by addressing the "Commissioner of Patents, Washington, D. C."